United States Patent
Bajard et al.

(10) Patent No.: US 9,269,142 B2
(45) Date of Patent: Feb. 23, 2016

(54) METHOD FOR DETERMINING A STATE OF OBSTRUCTION OF AT LEAST ONE CAMERA INSTALLED IN A STEREOSCOPIC SYSTEM

(71) Applicants: CONTINENTAL AUTOMOTIVE FRANCE, Toulouse (FR); CONTINENTAL AUTOMOTIVE GmbH, Hannover (DE)

(72) Inventors: Laure Bajard, Toulouse (FR); Alain Giralt, Toulouse (FR); Sophie Rony, Toulouse (FR); Gregory Baratoff, Wangen (DE)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/673,068

(22) Filed: Mar. 30, 2015

(65) Prior Publication Data
US 2015/0279018 A1 Oct. 1, 2015

(30) Foreign Application Priority Data
Mar. 31, 2014 (FR) ..................................... 14 52775

(51) Int. Cl.
*G06K 9/00* (2006.01)
*G06T 7/00* (2006.01)
*H04N 13/02* (2006.01)

(52) U.S. Cl.
CPC .............. *G06T 7/002* (2013.01); *G06T 7/0002* (2013.01); *G06T 7/0051* (2013.01); *G06T 7/0061* (2013.01); *H04N 13/0285* (2013.01); *G06T 2207/10012* (2013.01); *G06T 2207/20021* (2013.01); *G06T 2207/20221* (2013.01); *G06T 2207/30168* (2013.01); *G06T 2207/30252* (2013.01)

(58) Field of Classification Search
CPC ........... G06T 2207/10012; G06T 2207/20021; G06T 2207/20221; G06T 2207/30168; G06T 2207/30252; G06T 7/0002; G06T 7/002; G06T 7/0051; G06T 7/0061; H04N 13/0285
USPC ......................................................... 382/154
See application file for complete search history.

(56) References Cited

U.S. PATENT DOCUMENTS

| 8,116,523 | B2 | 2/2012 | Amagasaki |
| 2006/0228001 | A1 | 10/2006 | Tsukamoto |

(Continued)

FOREIGN PATENT DOCUMENTS

| EP | 2 293 588 A1 | 3/2011 |
| EP | 2 381 416 A1 | 10/2011 |

(Continued)

OTHER PUBLICATIONS

FR Search Report, dated Dec. 11, 2014, from corresponding FR application.

*Primary Examiner* — Stephen R Koziol
*Assistant Examiner* — Shaghayegh Azima
(74) *Attorney, Agent, or Firm* — Young & Thompson (57) ABSTRACT

To improve the performance for determining obstruction of a stereoscopic system using two cameras or more, a hybrid of local and semi-global methods is provided. For each stereoscopic image formed from simultaneous left and right images, a breakdown of each left and right image into corresponding sectors is applied. Obstruction level is determined by a disparity map by sector, based on left or right images, and in which a disparity is assigned to each pixel corresponding to the best matching score. A determination of density by sector of the disparity map is carried out by reference to a fraction of pixels with a disparity considered to be valid. A state of obstruction of at least one camera is determined based on a weighted average of the probabilities of obscuring of the sectors of the disparity map obtained by comparison between the density of the sectors and a predefined density level.

12 Claims, 4 Drawing Sheets

(56) References Cited

U.S. PATENT DOCUMENTS

2009/0180682 A1* 7/2009 Camus ............... G06T 7/0002
    382/154
2010/0013908 A1    1/2010 Chiu et al.
2011/0311102 A1* 12/2011 McDaniel ............ G05D 1/0251
    382/104
2013/0070966 A1    3/2013 Ehlgen et al.

FOREIGN PATENT DOCUMENTS

FR    2 884 316 A1    10/2006
FR    2 958 774 A1    10/2011

* cited by examiner

METHOD FOR DETERMINING A STATE OF OBSTRUCTION OF AT LEAST ONE CAMERA INSTALLED IN A STEREOSCOPIC SYSTEM

FIELD OF THE INVENTION

The present invention relates to a method for determining a state of obstruction, also referred to as blockage, of at least one camera in a stereoscopic system installed on board a vehicle, in particular an automobile vehicle, and contributing to assisting the driver of the vehicle in his/her driving.

BACKGROUND OF THE INVENTION

In the field of automobile safety and driving assistance, video systems carried on board vehicles are used for the detection of obstacles—objects or persons—or of events outside this vehicle. Using two onboard cameras, the video system managed by a digital processing system allows the distance between the vehicle and these obstacles to be determined. It is then possible to undertake various functionalities, for example: the detection of obstacles, the detection of hazards, the detection and the recognition of road signs, the continuous white line not to be crossed, or else the detection of cars coming from the other direction. The latter detection may be associated with the management of the lights of the vehicle.

The recognition of these obstacles or events is, furthermore, brought to the attention of the driver by warning of intervention from driving assistance systems. The reliability of the cameras is thus critical and can become decisive, for example when it is required to know in real time whether, in the absence of obstacles detected, the road really is free of obstacles or whether one of the cameras is at least partially obstructed. The detection of the obstruction of the cameras is therefore as important as the determination of good visibility. It should be noted that a frequent cause of obstruction is the condensation of water on the optics of the camera. In general, a detection of obstruction leads to warning the driver of the presence of such condensation and may trigger demisting/defrosting means.

The determination of an amount of obstruction of an onboard camera is dealt with in the patent document US 2013/0070966. In this document, the screen is divided into sectors and the probability of obstruction is analyzed by sector based on a measurement of the number of objects detected by their contour within each sector. This is a method of analysis by image sector.

The detection of the camera obstruction according to this method only offers limited performances: a partial obstruction of the camera is only detected in 75% of cases, the average distance for carrying out this detection being 200 meters. Moreover, at start-up, an average distance of 30 meters is needed to determine the status of the obstruction of the camera.

Using the same approach by sector, the idea of the patent document U.S. Pat. No. 8,116,523 is to generate image data by an "edge map extraction" and a detection of characteristic points based on this data. The characteristic points are categorized according to three detection scan regions respectively arranged at a near distance, a medium distance and far away from the vehicle: a region dedicated to roads, another for the side roads and junctions and a region intended for blind alleys or obstacles. In this way, the number of image processing steps is reduced with respect to the detection of fixed models with a scan of the whole image in order to verify the correspondence of the image to the models.

Other methods have been developed for stereoscopic systems with two cameras allowing additional information on depth of the objects and obstacles of the scene observed by the driver to be provided. The depth of a pixel of an element of this scene is inversely proportional to the shift, otherwise referred to as "disparity", of the matching pixels from the left and right images corresponding to the initial pixel of the scene and respectively detected by the left and right cameras. A disparity map is composed of the set of disparities between the pixels thus matched.

The generation of the successive disparity maps over time allows the performance of the driving aid applications to be enhanced using depth information for the scene. The use of disparity maps is for example illustrated by the patent documents US 2010/0013908, EP 2 381 416 or FR 2 958 774.

The problem is to correctly match the pixels of the left and right images. Conventionally, the generation of a disparity map is carried out in two steps: the determination of various degrees of matching, also referred to as "matching scores", for each pair of pixels and the extraction of an estimation of disparity for each pair of pixels.

The first step is carried out by taking into account, for each pixel of a pair being analyzed, pixels within its environment. The scores correspond to the degree of similarity between the pixels of the pair under analysis. The second step allows the most probable disparity, estimated based on the matching scores of this pixel, to be assigned to each pixel from one of the two left or right images, called reference pixel. The set of pixels from the reference image onto which the retained disparities have been transferred constitutes the disparity map of the stereoscopic image.

Generally speaking, three types of method have been developed for producing disparity maps depending on the mode of determination of the scores and the mode of expression of the disparities: local, global and semi-global methods.

Local methods are based on the matching scores of each pair of pixels from each image obtained between the pixels immediately surrounding two pixels to be matched. Various correlation functions may be used (sum of the squared differences, sum of the absolute differences, centered normalized intercorrelation, etc.) in order to then determine the disparities of the matched pixels. For each pair of pixels analyzed, the disparity corresponding to the best score is selected.

These local methods are the simplest and hence occupy fewer resources. They generate high-density disparity maps, in other words with a large fraction of pixels with a disparity considered to be valid, the validity being based on a coherence criterion between the disparities of paired pixels. However, these local methods suffer from a high error rate, notably in the areas of occlusion and in the areas with little texture—for example for a new road.

Global methods consist in optimizing an energy function defined over the whole reference image. The energy function defines the constraints with which the disparity map must comply, for example the continuity of the disparity over the objects. Subsequently, the set of the disparities which minimize this energy function is sought. The Graph-Cut method and Belief Propagation are the most studied global methods.

These methods yield dense disparity images comprising few errors. They are, however, complex to implement and require very significant processing and memory resources which are not very compatible with the onboard hardware constraints.

Semi-global methods are based on the same principle as the global methods but on subsets of the image, namely lines or blocks. The breakdown of the problem of optimization of the energy function into subproblems allows the requirements in processing and memory resources to be decreased with respect to the global methods, but leads to the recurrence of the appearance of artifacts on the disparity map, with a non-negligible error rate and an average—to mediocre-density disparity map (which results from the presence of artifacts).

SUMMARY OF THE INVENTION

The main aim of the invention is to improve the performance characteristics of the determination of a state of obstruction of a stereoscopic system with two cameras, with a low error rate while at the same time extracting disparity maps with a high density, with processing and memory resources of a reasonable size allowing ready onboard installation. For this purpose, the invention provides a hybrid approach between the local and semi-global methods, using individual disparity maps based on a breakdown of the images into sectors in a direct semi-global analysis, without using an energy function.

For this purpose, the subject of the present invention is a method for determining a state of obstruction of at least one camera in a multi-camera system installed on board a vehicle comprising the following steps:
  acquisition of the successive stereoscopic images of a field of view, each stereoscopic image from the multi-camera system being formed from left and right images produced simultaneously and stored digitally in the form of pixels,
  calculation of a disparity map based on successive multi-camera images, and
  calculation of a level of obstruction.

In this method, the level of obstruction is a weighted average determined by the following successive steps:
  division of the disparity map into sectors,
  determination of the density of each sector by the fraction of pixels with a disparity considered to be valid,
  determination of a probability of stereo obstruction by sector of the disparity map by comparison between the density of this sector and a predefined level of obstruction, and
  determination of a weighted average of the probabilities of obscuring of the sectors as a function of a weighting of the position of these sectors within the disparity map.

This method then offers, with respect to other methods using one or more cameras, a higher speed of decision with regard to a potential obstruction—even in the absence of objects partially masking the vehicle—a greater speed of detection and a higher rate of obstruction detection.

Thus, in order to define a level of obstruction within the framework of the invention, a single textured surface in the field of view—for example a road—may be sufficient and the presence of objects is not therefore necessary. The performance characteristics procured by the invention are associated with the speed of the calculations owing to the methodology followed. For example, an absence of obstruction of the cameras after the time needed for the vehicle to drive only 12 meters, instead of around 30 meters with the methods of the prior art.

In a preferred embodiment:
  a digital filtering of disparity noise can be carried out by sector on the disparity map prior to the determination of density of the sectors,
  the digital filtering of the disparity noise can be carried out by the application of mathematical morphology tools to the disparity map.

According to other particularly advantageous embodiments:

each sector being broken down into subsets called macroblocks, these macroblocks being able to have the same size and be regularly distributed within each sector, the digital filtering of the disparity noise is carried out by sector by measuring the density of each macroblock of this sector by its fraction of pixels whose disparity greater than a threshold is considered to be valid, the proportion of macroblocks considered to be valid determining the density of the sector,
  the probability of stereo obstruction by sector is determined by comparison between the percentage of macroblocks considered to be valid in this sector and a predefined level of obstruction,
  the number of sectors may be chosen substantially between 10 and 50,
  the number of macroblocks by sector may be substantially chosen between 10 and 100.

Advantageously, a mono-stereo combined analysis test is carried out as a complement to the calculation of the level of obstruction in order to determine the presence of an object in front of a camera. This test includes the following steps, for each image analyzed:
  selection of one of the two stereo images to be analyzed, referred to as mono image,
  breakdown of this mono image into sectors with the same dimensions as those of the disparity map so as to form a mono map,
  calculation of a probability of mono obstruction by sector of the mono image transferred onto the mono map,
  comparison of the probabilities of stereo and mono obstruction, then merging between the filtered disparity map, having probabilities of stereo obstruction by sector, and the mono map, having probabilities of mono obstruction by sector, by assigning to each sector of the filtered disparity map the lowest probability of obstruction, corresponding to the highest density, in order to generate a filtered disparity map referred to as merged, and
  if the merged probability of obstruction is globally lower than the probability of stereo obstruction, the camera corresponding to the image being analyzed is considered as potentially obstructed,
  in the opposite case, a mobile object is considered as having masked the field of view of the camera being analyzed and a processing is triggered.

Preferably, the calculation of the probability of mono obstruction by sector is carried out by an edge detection analysis and a detection of characteristic points using the detection data.

BRIEF DESCRIPTION OF THE DRAWINGS

Other data, features and advantages of the present invention will become apparent upon reading the non-limiting detailed description hereinafter, with reference to the appended figures which show, respectively.

DETAILED DESCRIPTION OF THE INVENTION

Figure 1:
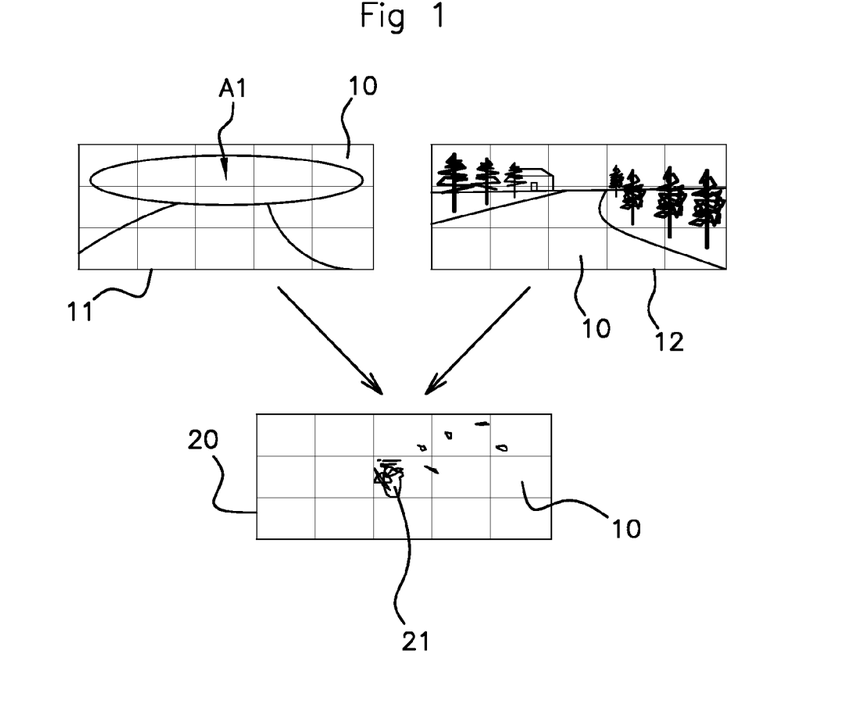
FIG. 1, an example of images acquired by the two cameras of a stereoscopic system associated with the disparity map formed from these images according to one embodiment of the method of the invention, FIG. 2, an example of a disparity map whose sectors are divided up into macroblocks according to one particular embodiment of the invention, FIG. 3, an example of weighting for the calculation of the level of obstruction of a camera of the stereoscopic system, FIGS. 4a and 4b, the flow diagram of one mode for determining the level of obstruction of a camera according to the invention by means of a disparity map, and FIG. 5, a mono-stereo combined approach for detecting the presence of a temporary masking of the field of view of a camera based on an edge detection of the mono type and a comparison of the mono and stereo levels of obstruction.

FIG. 1 illustrates one example of left 11 and right 12 images received on the cameras of a stereoscopic display system on board an automobile vehicle. The disparity map 20 generated by a digital processing system (not shown) from these images 11 and 12 is also shown. The images 11, 12 are divided up into 5×3 regular sectors 10 and the disparity map 20 is accordingly divided into 5×3 sectors. Alternatively, it is possible directly divide up the disparity map into sectors.

The right image 12 is complete, whereas it would appear that the left image 11 does not reproduce at least the upper region of interest A1 seen on the right image 12. The field of view of the left camera corresponding to the image 11 is thus partially obscured over this upper region A1 which covers the five upper sectors.

The disparity map 20 is determined by transfer of the disparities by sector 10 based on the pixels of one of the images serving as a reference, here the left-hand image 11. Each disparity represents in the example the distance calculated by the squared difference between the pixels of the images 11 and 12 which have the best matching score.

The result of the partial obstruction of the zone A1 is that the disparity map 20 has artifacts 21. These defects correspond to low density levels by sector such as determined from the disparities in these sectors—and hence a high level of obstruction—as is detailed hereinafter.

Figure 2:
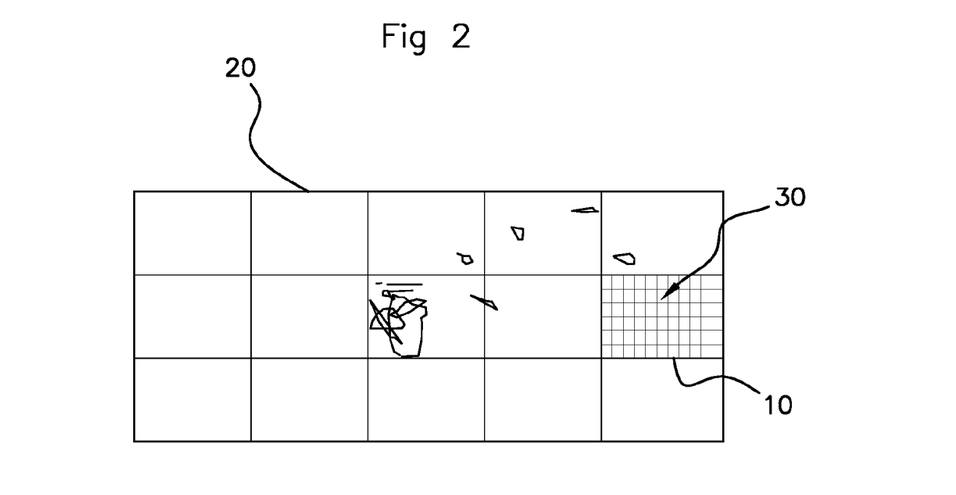

With reference to the example of implementation of one particular variant in FIG. 2, each sector 10 of the disparity map 20 is advantageously broken down into 6×11 macroblocks 30 with the same dimensions (only one macroblock is shown so as not to spoil the clarity of the figure). This additional degree of breakdown is used for a higher resolution analysis of the density, shown with reference to FIGS. 4a and 4b.

In this disparity map 20 thus divided up into sectors 10 and macroblocks 30—the disparity densities are measured within each macroblock 30. Then, the density is calculated by sector 10 from the disparity densities of the macroblocks 30 of this sector 10, a dense sector being defined by a high proportion of macroblocks with a density greater than a given threshold.

Figure 3:
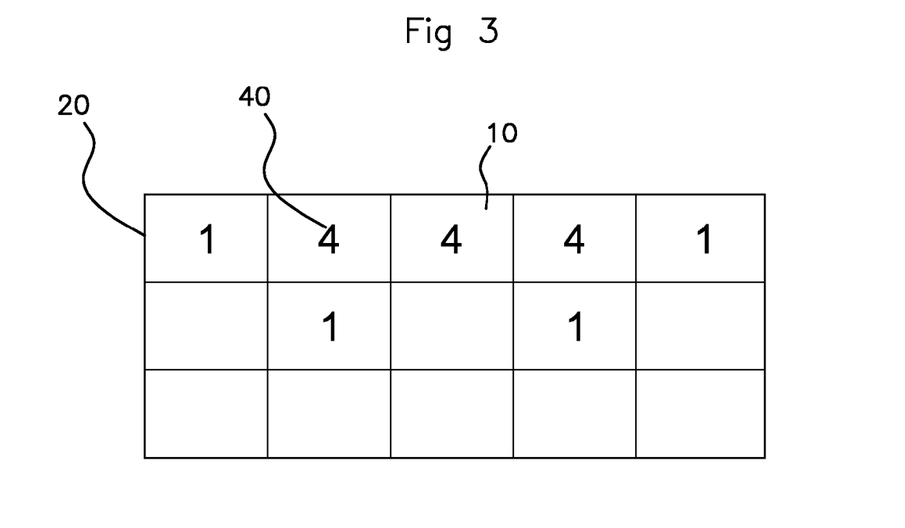

Overall, the level of obstruction of a camera is calculated by weighting the densities of the sectors as a function of their position within the image produced by the camera. FIG. 3 shows one example of weighting for the calculation of the overall level of obstruction of a camera of the stereoscopic system. Each sector 10 has weighting coefficients 40, and the overall level of obstruction of the camera is calculated by an average of the density levels of the sectors 10 weighted by means of these coefficients 40. The strongest weightings with a coefficient "4" correspond to the sectors 10 previously judged as belonging to important regions of interest. Such a weighting is applicable to the densities determined by sector 10 of the disparity map 42 shown in FIG. 5.

Figure 4A:
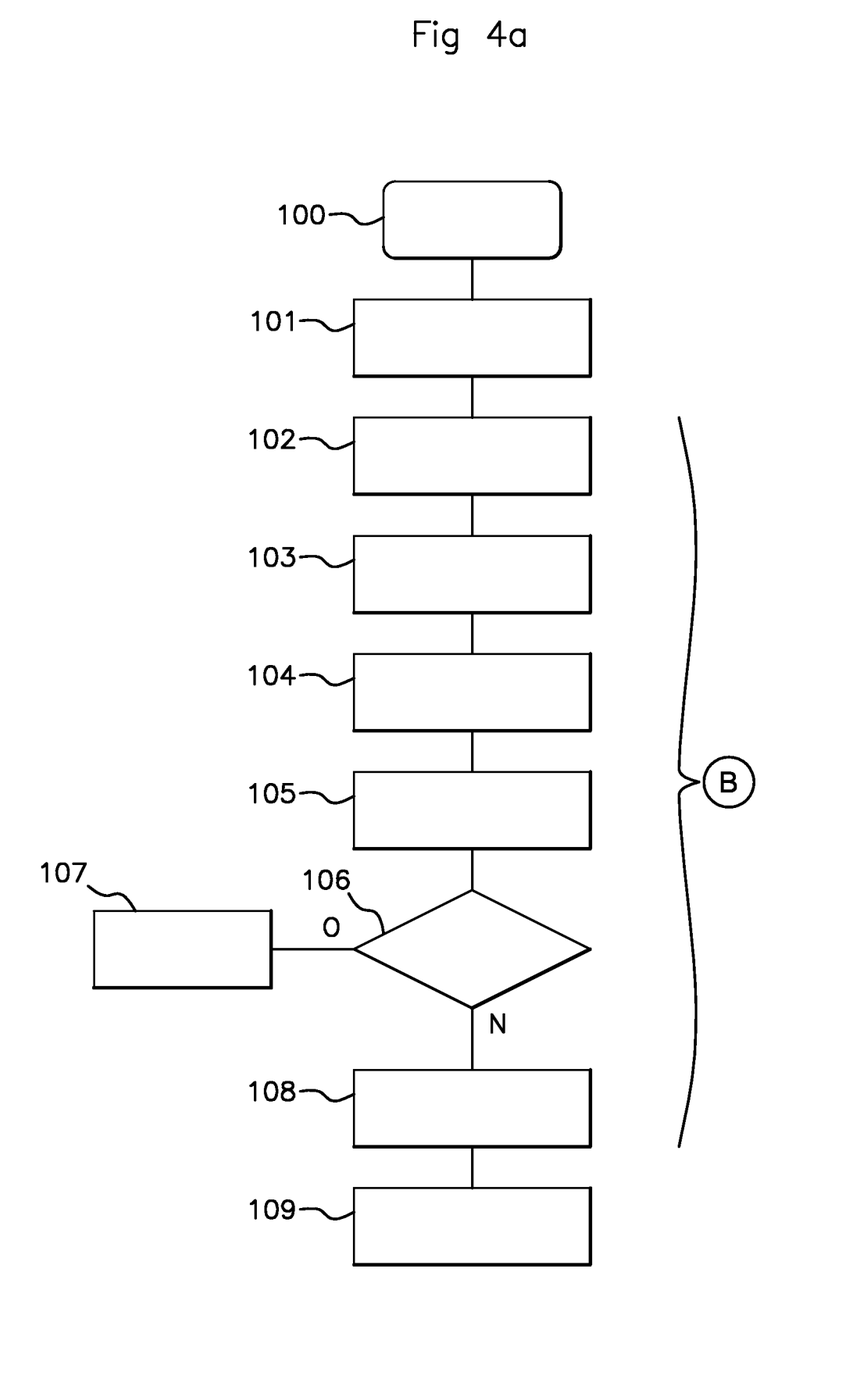
Figure 4B:
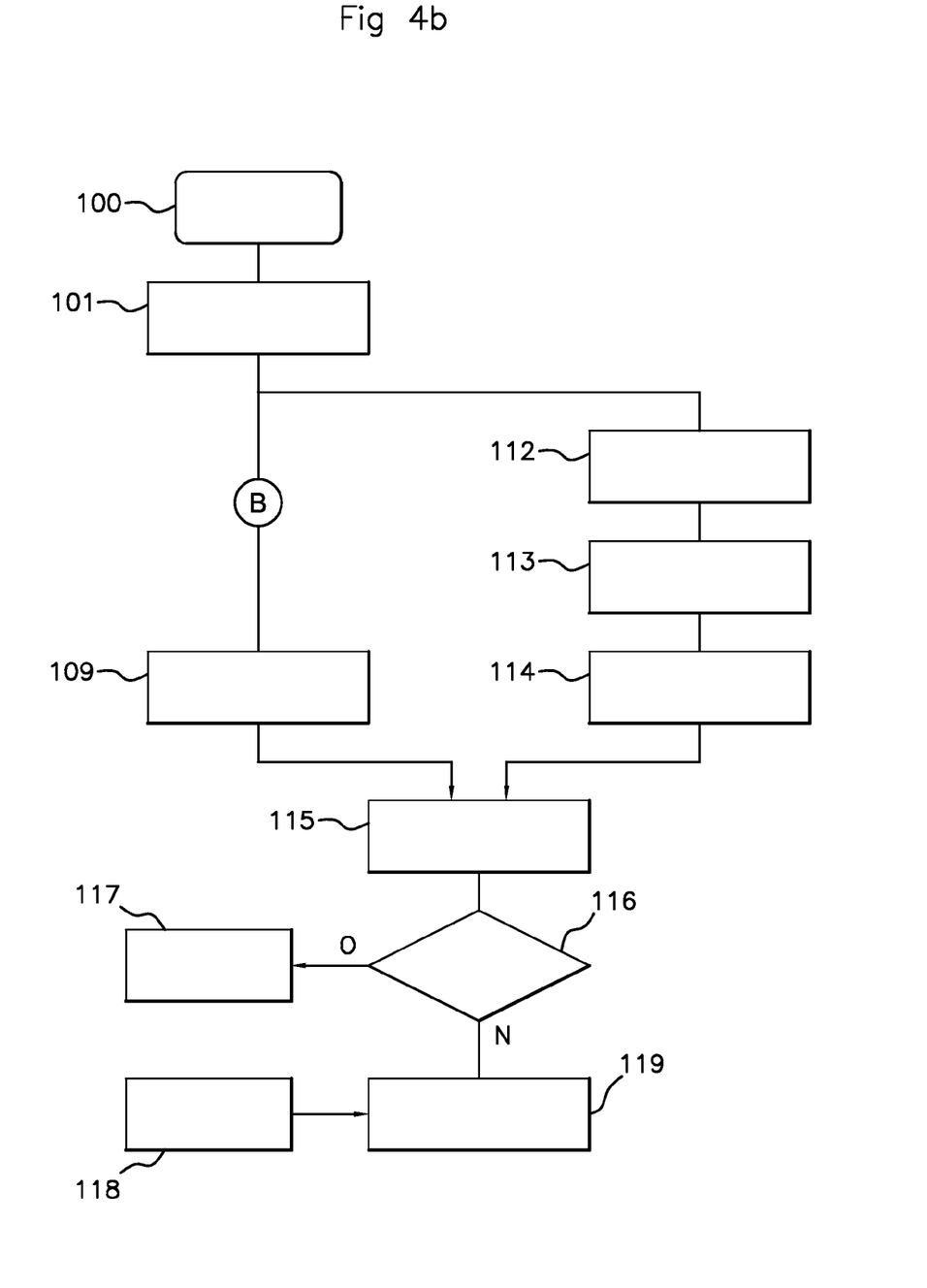

One example for determining a state of obstruction of a camera based on a weighted average of the density levels by sector of the disparity map is illustrated by the flow diagram in FIG. 4a, the flow diagram being completed in FIG. 4b. All of the steps 102 to 108 in FIG. 4a appear in FIG. 4b under the reference "B" in order to simplify the reading of this FIG. 4b. In FIG. 4a, the first step 100, called "Start", is used for the initial setup, in particular for the calibration of one camera with respect to the other, by association of pairs of similar small areas from each of the images.

The step 101 relates to the taking of successive stereoscopic left and right images of the field of view, according to a given frequency, such as the images 11 and 12 in FIG. 1. The images are stored in a digital processing system.

These images allow the disparity map to be generated (step 102), by assigning to each pixel a matching score representative of the degree of similarity between two pixels from the stereoscopic left and right images then matched. This map is said to be unfiltered, because it can contain disparity noise due to an obstruction, to a masking of a camera by an object or to a de-calibration of a camera. The following steps allow any potential disparity noise to be eliminated.

During the step 103, the disparity map is divided up into sectors (in accordance with the description with reference to FIG. 2).

In this example, the 15 sectors of the disparity map are divided up into macroblocks, 66 macroblocks in this example (step 104). Advantageously, a digital filtering of the disparity noise allows, by an analysis of density within each of the macroblocks of each sector (step 105), the density of this sector to be more finely defined. The density analysis step 105 is carried out in the following manner. For each macroblock, the density is measured by its fraction of pixels whose disparity is considered to be valid by comparison with a threshold. In this example, the macroblocks whose density is higher than a fraction of 80% are considered to be valid.

Alternatively, a digital filtering of the disparity noise may be carried out directly by sector using mathematical morphology tools known to those skilled in the art.

As an option or independently in a parallel sequence, it is then possible, following the density analysis step 105, to detect in a de-calibration test 106 whether an observed noise is due to a de-calibration or to interference of the obstruction type, since the disparity map is affected differently in these two cases. This test is carried out by performing an initial setup of the onboard multi-camera system. If the de-calibration test concludes that there is a de-calibration, a re-calibration is advantageously carried out (step 107).

Then, at the step 108, the density by sector is determined by the proportion of macroblocks considered to be valid within each of the sectors. After determination of the density of all the sectors, the disparity map is said to be "filtered".

The calculation of probability of obstruction is subsequently undertaken by sector. It consists, at the step 109, in comparing the percentages of macroblocks considered to be valid within this sector with a predefined level of obstruction. In the example, if the percentage of macroblocks considered to be valid within the sector is higher than 35%, this sector is considered as unobstructed.

Alternatively, it is also possible, in a simplified version of the exemplary embodiment, not to use macroblocks in the analysis steps B (steps numbered 104 to 108).

For this purpose, at the step 109 for calculation of probability of obstruction, the filtered densities by sector are directly used instead of the densities of the macroblocks considered to be valid, by comparing the density of each sector (defined at the step 108 for calculation of density by the fraction of pixels by sector whose disparity is considered to be valid) with the predefined density percentage, here 35%.

In the following part of the method, a disparity analysis based on the density of the macroblocks composing each of the sectors is taken into account.

Once the density of the macroblocks by sector has been defined at the step 108, the probability of obstruction by sector supplied by the calculation (step 109) is referred to as the probability of stereo obstruction (to be distinguished from the probability of mono obstruction described hereinbelow) since it is carried out on the sectors of the disparity map generated from the images of the stereoscopic system.

FIG. 4b shows the following part of the method according to the invention which will advantageously allow it to be verified whether the noise observed on the disparity map is due to a real obstruction or to an object masking the field of view of one of the two cameras.

This verification consists in establishing the probabilities of obstruction by sector 10c from a disparity map said to be "merged" 42 illustrated with reference to FIG. 5 (described further on) using the filtered disparity map referred to as "stereo map" 22 and using a map referred to as "mono map" 32, formed from the image supplied by the camera being analyzed.

This mono map in fact corresponds to the image selected (step 112) from between the two stereoscopic images 11 and 12 (FIG. 1) taken at the step 101: in order to determine the state of obstruction or of masking of each camera, the analysis is undertaken, more precisely, by selecting (step 112) one or the other of the images 11 or 12, the left image 11 in the example illustrated (cf. FIG. 5), for analyzing the corresponding camera. Prior to the comparison and merging step (step 115), the selected image is divided into sectors (step 113) in the same manner as the disparity map in order to form the mono map 32, into 15 sectors in this example. Then, an analysis of probability of obstruction by a mono method (step 114), an edge detection analysis in the example, is carried out on the mono map 32. The calculation of the mono probabilities by sector 10a (FIG. 5) is then transferred onto the mono map 32.

The comparison in the step 115 is carried out, sector by sector, between the probabilities of stereo obstruction by sector (step 109), which appear on the stereo disparity map, and the probabilities of mono obstruction by sector from the mono map. This comparison leads, still in the step 115, to assigning to each sector of the stereo disparity map the lowest probability of obstruction (or, in other words, the highest density), mono or stereo, of the corresponding sector. The probabilities retained are referred to as "merged", and the disparity map thus obtained at the step 115, having the probabilities of obstruction thus "merged", is also referred to as "merged".

This step 115 for comparison and for merging of the probabilities of stereo and mono obstruction allows a potential masking of a camera by an object to be eliminated as explained hereinbelow.

If, in a masking test 116, the overall merged probability of obstruction from the disparity map—obtained at the step 115—is greater than or equal to the overall probability of obstruction from the stereo map, the camera corresponding to the image analyzed in the step for analysis of probability of mono obstruction (step 114) is considered as potentially being obstructed but without being masked. The overall probabilities of obstruction are calculated by an average or by summing of the values by sector.

In the opposite case, an obstacle or object is considered as having masked the field of view of the camera being analyzed, for example an object close to this camera. The analysis of the results of this masking test 116 then leads to taking, as a consequence (step 117), appropriate measures (temporary disabling of the camera or intervention on the camera) and/or informing the driver.

If the camera being analyzed is not considered as masked, then the step 119 calculates, with the weighting of the sectors, the overall probability of obstruction based on the weighted average of the probability of obstruction of the sectors. The weighting is determined in the prior step 118 as a function of the position of the sectors within the image as detailed hereinabove (with reference to FIG. 3).

The state of obstruction to be reported to the driver of the vehicle is one of the following pieces of information: no obstruction—condensation—partial obstruction—obstruction. The obstruction may be due to condensation, to the presence of a sticker, snow, ice or salt or something equivalent on the windshield. In the example, the system is considered as totally obstructed with an overall probability equal to at least 90%, and between 70% and 90% the system is considered as "degraded" by condensation or by a partial obstruction.

Figure 5:
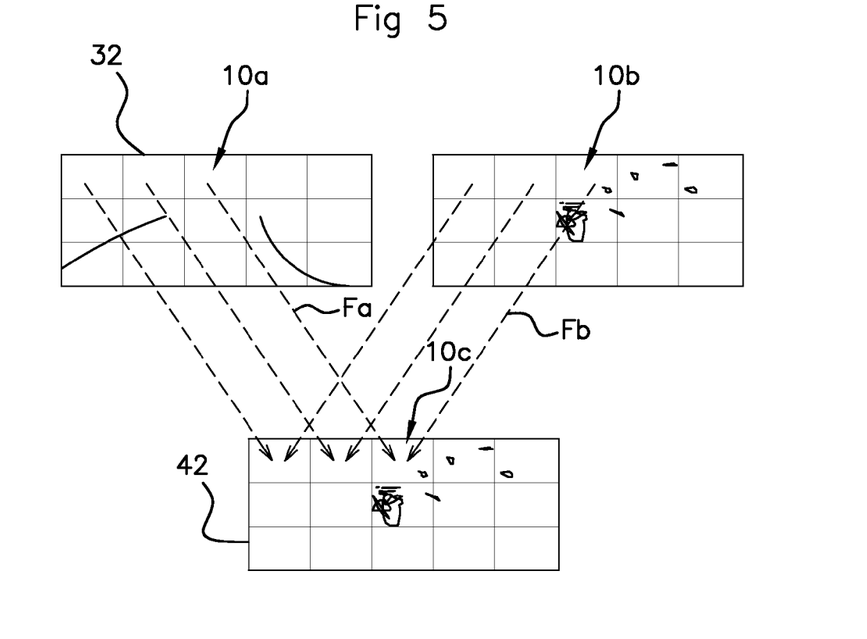

FIG. 5 illustrates the mono-stereo combined approach used for detecting the presence of a potential masking of the field of view of a camera, as shown in FIG. 4b at the step 115. This detection is carried out by comparison of the probabilities of stereo and mono obstruction by sector, which comparison uses the values transferred onto the filtered disparity map 22, for the probability of stereo obstruction by sector, and onto a mono map 32 corresponding to the image being analyzed, the image 11 in the example, for the probability of mono obstruction by sector (steps respectively referenced 109 and 114 in FIG. 4b).

For each pair of sectors 10a, 10b of these two maps 32 and 22, the mono and stereo densities are compared (arrows Fa, Fb), as described with reference to the flow diagram in FIG. 4b. The comparison (arrows Fa, Fb) between the mono and stereo approaches defines, by sector 10c, a modified disparity map 42 having a merged probability of obstruction by sector. For each sector 10c of this map, the probability of obstruction of the camera corresponds to the minimum of the mono and stereo densities. If, overall, the density of the disparity map 42 is less than the overall stereo density, the camera is considered as obstructed. In the opposite case, it would appear that a mobile obstacle or object has probably masked the field of view of the camera being analyzed.

The invention is not limited to the exemplary embodiments described and shown. Thus, the invention may be applied to systems of more than two cameras using the method for each set of cameras of the system (pair, triplet, quadruplet, etc.).

It is furthermore possible to implement the method according to the invention without dividing the sectors up into macroblocks and by replacing the steps discriminating as a function of the densities of the macroblocks by steps depending directly on the densities of the sectors, after filtering by a mathematical morphology or other equivalent filtering.

Furthermore, the sectors made to correspond from one camera image to another have identical dimensions but the sectors of the same image may be of different dimensions. For example, depending on the critical nature with regard to safety, the sectors of the upper rows such as the upper region of interest A1 (with reference to FIG. 1) may be smaller, and with a somewhat greater weighting, in order to increase their number and hence the precision of the analysis.

The invention claimed is:

1. A method for determining a state of obstruction of at least one camera in a multi-camera system installed on board a vehicle comprising the following steps:
    acquisition of the successive stereoscopic images of a field of view, each stereoscopic image from the multi-camera system being formed from left and right images (11, 12) produced simultaneously and digitally stored in the form of pixels, calculation of a disparity map based on successive multi-camera images, and calculation of a level of obstruction as being a weighted average determined by the following steps:

breakdown of the disparity map (20) into sectors (10), determination of the density of each sector (10) by the fraction of pixels with a disparity considered to be valid (108), determination of a probability of stereo obstruction by sector (109) of the disparity map (20) by comparison between the density of this sector (10) and a predefined level of obstruction, and determination (119) of a weighted average of the probabilities of obscuring of the sectors (10) as a function of a weighting (118) of the position of these sectors (10) within the disparity map (20), wherein the method furthermore comprises a complementary mono-stereo combined analysis test including the following steps in order to determine the presence of an object in front of a camera:

selection (112) of one of the two stereo images (11; 12) to be analyzed, referred to as mono image;

breakdown (113) of this mono image (11; 12) into sectors (10a) with the same dimensions as those (10b) of the disparity map (22) in order to form a mono map (32);

calculation (114) of a probability of mono obstruction by sector (10a) of the mono image (11; 12), carried out by an edge detection analysis and a detection of characteristic points using the detection data, transferred onto the mono map (32);

comparison of the probabilities of stereo and mono obstruction, then merging (115) between the disparity map (22), having the probabilities of stereo obstruction (109) by sector (10b) and the mono map (32), having the probabilities of mono obstruction (114) by sector (10a), by assigning to each sector (10b) of the disparity map (22) the lowest probability of obstruction, corresponding to the highest density, so as to generate a disparity map referred to as merged (42); and if the probability of merged obstruction is globally less than the probability of stereo obstruction (test 116), the camera corresponding to the image being analyzed (11; 12) is considered as potentially obstructed and a processing is triggered (117);

in the opposite case, an object is considered as having masked the field of view of the camera being analyzed.

2. The method for determining a state of obstruction as claimed in claim 1, in which a digital filtering of disparity noise (105) is carried out by sector (10) on the disparity map (20) prior to the determination (108) of density of the sectors.

3. The method for determining a state of obstruction as claimed in claim 2, in which the digital filtering of the disparity noise (105) is carried out by the application of mathematical morphology tools to the disparity map (20).

4. The method for determining a state of obstruction as claimed in claim 2, in which, each sector (10) being broken down into subsets called macroblocks (30), with the same dimensions and regularly distributed within each sector (10), the digital filtering of the disparity noise (105) is carried out by sector (10) by measuring the density of each macroblock (30) of this sector (10) by its fraction of pixels whose disparity higher than a threshold is considered to be valid, the proportion of macroblocks (30) considered to be valid determining (108) the density of the sector (10).

5. The method for determining a state of obstruction as claimed in claim 4, in which the probability of stereo obstruction by sector (10) is determined by comparison (step 109) between the proportion of macroblocks (30) considered to be valid in this sector (10) and a predefined level of obstruction.

6. The method for determining a state of obstruction as claimed in claim 1, in which the number of sectors (10) is chosen substantially between 10 and 50.

7. The method for determining a state of obstruction as claimed in claim 4, in which the number of macroblocks (30) by sector (10) is chosen substantially between 10 and 100.

8. The method for determining a state of obstruction as claimed in claim 2, in which the number of sectors (10) is chosen substantially between 10 and 50.

9. The method for determining a state of obstruction as claimed in claim 3, in which the number of sectors (10) is chosen substantially between 10 and 50.

10. The method for determining a state of obstruction as claimed in claim 4, in which the number of sectors (10) is chosen substantially between 10 and 50.

11. The method for determining a state of obstruction as claimed in claim 5, in which the number of sectors (10) is chosen substantially between 10 and 50.

12. The method for determining a state of obstruction as claimed in claim 5, in which the number of macroblocks (30) by sector (10) is chosen substantially between 10 and 100.

* * * * *